(12) United States Patent
Pang et al.

(10) Patent No.: US 11,470,159 B2
(45) Date of Patent: Oct. 11, 2022

(54) API KEY SECURITY POSTURE SCORING FOR MICROSERVICES TO DETERMINE MICROSERVICE SECURITY RISKS

(71) Applicant: Cisco Technology, Inc., San Jose, CA (US)

(72) Inventors: Jackson Ngoc Ki Pang, Sunnyvale, CA (US); Ashutosh Kulshreshtha, Cupertino, CA (US); Preethi Narayan, San Carlos, CA (US); Vishal Jaswant Thakkar, Fremont, CA (US); Aria Rahadian, San Jose, CA (US); Zhiwen Zhang, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/157,388

(22) Filed: Jan. 25, 2021

(65) Prior Publication Data

US 2022/0070279 A1 Mar. 3, 2022

Related U.S. Application Data

(60) Provisional application No. 63/071,760, filed on Aug. 28, 2020.

(51) Int. Cl.
*H04L 67/133* (2022.01)
*H04L 9/40* (2022.01)
*H04L 67/51* (2022.01)

(52) U.S. Cl.
CPC ........ *H04L 67/133* (2022.05); *H04L 63/0428* (2013.01); *H04L 63/1433* (2013.01); *H04L 67/51* (2022.05)

(58) Field of Classification Search
CPC . H04L 67/40; H04L 63/0428; H04L 63/1433; H04L 67/16; H04L 63/105;
(Continued)

(56) References Cited

U.S. PATENT DOCUMENTS

2010/0293385 A1  11/2010 Nanda et al.
2017/0331829 A1*  11/2017 Lander .................... G06F 21/33
(Continued)

FOREIGN PATENT DOCUMENTS

| EP | 3361701 A1 | 8/2018 |
| EP | 3693874 A1 | 8/2020 |
| KR | 102080230 | 2/2020 |

OTHER PUBLICATIONS

International Search Report and Written Opinion from the International Searching Authority, dated Nov. 25, 2021, 12 pages, for corresponding International Patent Application No. PCT/U20S21/046979.

*Primary Examiner* — Benjamin M Thieu
(74) *Attorney, Agent, or Firm* — Polsinelli

(57) ABSTRACT

The present disclosure provides systems, methods, and computer-readable media for determining an objective measure of breach exposure of Application Programming Interface (API) infrastructure for microservices. In one aspect, a method includes analyzing header information of Application Programming Interface (API) call stacks between microservices; determining, for each API call stack, corresponding security key information based on the header information; determining location information of each of the microservices; and determining a vulnerability score for each of the microservices based on the corresponding security key information and corresponding location information of each of the microservices.

20 Claims, 7 Drawing Sheets

(58) Field of Classification Search
CPC ......... H04L 63/20; H04L 67/32; H04L 63/08;
G06F 8/53; G06F 21/577
See application file for complete search history.

(56) References Cited

U.S. PATENT DOCUMENTS

| | | |
|---|---|---|
| 2018/0013763 A1* | 1/2018 | Wilson .................. H04L 63/101 |
| 2018/0075231 A1 | 3/2018 | Subramanian et al. |
| 2019/0095183 A1 | 3/2019 | Shukla et al. |
| 2019/0155597 A1 | 5/2019 | Lander et al. |
| 2019/0273746 A1 | 9/2019 | Coffing |
| 2019/0334789 A1* | 10/2019 | Roche .................. G06K 9/6218 |
| 2020/0127980 A1* | 4/2020 | Smith .................. H04L 63/0407 |
| 2020/0267202 A1 | 8/2020 | Koszek |

* cited by examiner

API KEY SECURITY POSTURE SCORING FOR MICROSERVICES TO DETERMINE MICROSERVICE SECURITY RISKS

CROSS-REFERENCE TO RELATED APPLICATIONS

This application claims priority to U.S. Provisional Patent Application No. 63/071,760, filed on Aug. 28, 2020, the content of which is incorporated herein by reference in its entirety.

TECHNICAL FIELD

The subject matter of this disclosure relates in general to the field of computer network security, and more specifically to Application determining Programming Interface (API) infrastructure breach exposure for microservices used within a network.

BACKGROUND

Microservices and containers have been gaining traction in the new age of application development and computer networking. Application Programming Interfaces (APIs) have also gained traction in conjunction with microservices and containers as enterprise networks attempt to seamlessly integrate the customer experience as customers move between the web, personal mobile devices and the Internet of Things. An Application Programming Interface (API) is a set of instructions that allow for creation of applications that can access data and features of other applications, services and/or operating systems through API calls. Vulnerability and exposure of APIs to unauthorized access can expose microservices and the broader network to security risks and attacks.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
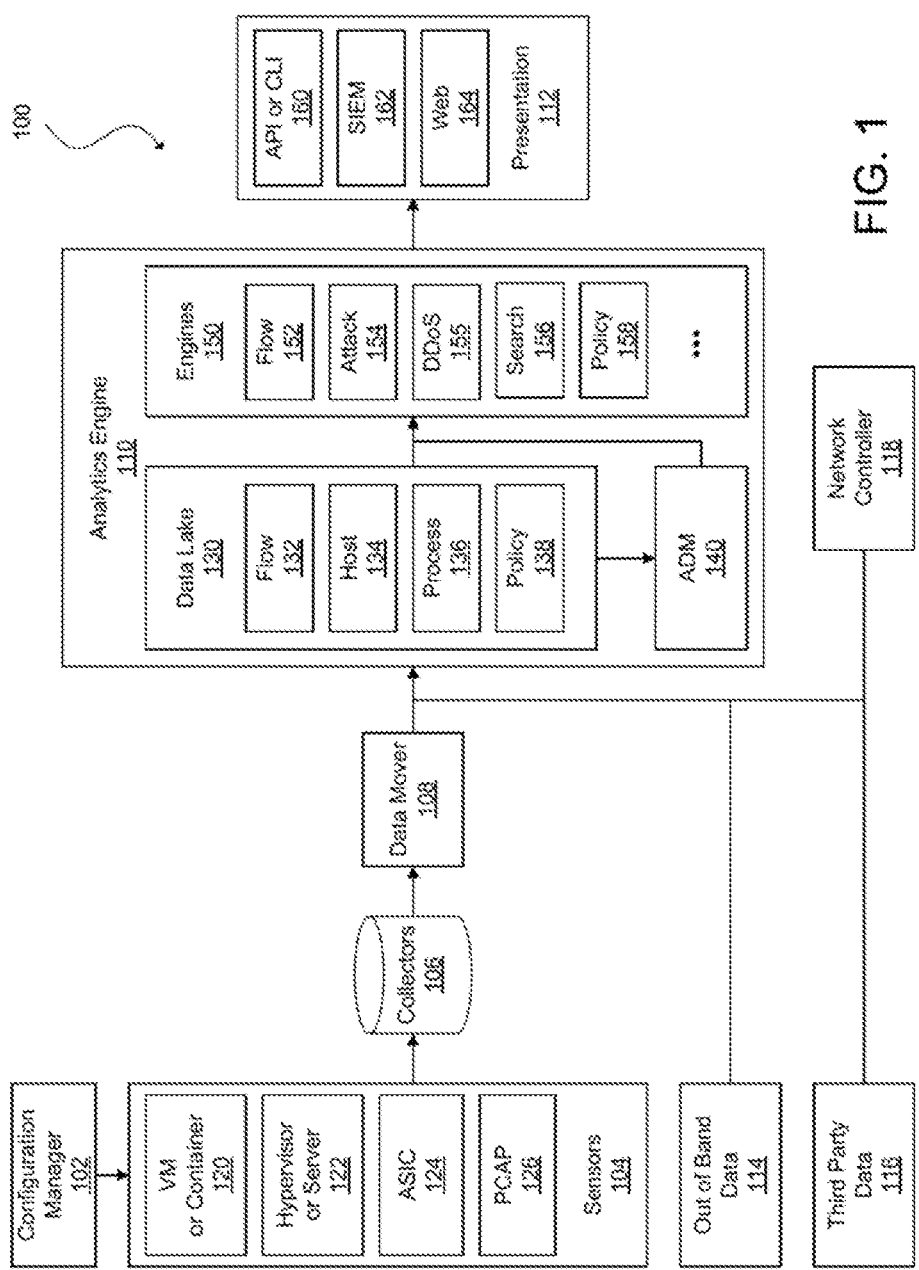
FIG. 1 illustrates an example of a network traffic monitoring system, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Aspects of the subject technology relate to determining an objective measure of breach exposure of Application Programming Interface (API) infrastructure for microservices utilized for various processes in a network. The objective measure can be a score (vulnerability score) determined based on information about usage of security keys in API calls between microservices and locations of workloads (locations of network nodes on which microservices are running). The score can represent a security posture of an API key and more generally security risk or breach exposure of the overall API infrastructure that can possibly alert network operators of the need to update/change usage of security keys to increase security and thus lower the risk of exposure of API infrastructure to unauthorized access or attacks.

In one aspect, a method includes analyzing header information of Application Programming Interface (API) call stacks between microservices; determining, for each API call stack, corresponding security key information based on the header information; determining location information of each of the microservices; and determining a vulnerability score for each of the microservices based on the corresponding security key information and corresponding location information of each of the microservices.

In another aspect, the header information of one of the API call stacks includes at least one destination address associated with each API call stack, resource locator information of each API call stack, credential header information of each API call stack, source information of at least one network address originating each API call stack, and a timestamp of each API call stack.

In another aspect, the corresponding security key information includes at least a type of security keys used, a security key rotation schedule for API call stack authentication, and reused security keys across more than one group of the microservices.

In another aspect, determining the corresponding security key information based on the header information further includes indexing each of the microservices with a corresponding set of the API call stacks in a time series with security key information of the corresponding set of the API call stacks.

In another aspect, determining the vulnerability score for each of the microservices further includes identifying a set of violations based on the security key information and the location information; and assigning a base score for each of the set of violations.

In another aspect, wherein the location information of each of the microservices includes a location of each of the microservices and a distance between each of the microservices and an external network.

In another aspect, the method further includes applying security policies on an application node based on the vulnerability score, wherein the security policies include at least one of: presenting a vulnerability score for each of the microservices; generating an alert for a first microservice of the microservices if a first vulnerability score of the first microservice is below a first threshold score, and providing at least one solution based on the security key information; and stopping an API call to a second microservice of the microservices with a second vulnerability score below a second threshold score.

In one aspect, a system includes one or more memories having computer-readable instruction stored therein and one or more processors, The one or more processors are configured to execute the computer-readable instructions to analyze header information of Application Programming Interface (API) call stacks between microservices; determine, for each API call stack, corresponding security key information based on the header information; determine location information of each of the microservices; and determine a vulnerability score for each of the microservices based on the corresponding security key information and corresponding location information of each of the microservices.

In one aspect, one or more non-transitory computer-readable storage media includes computer-readable instructions which, when executed by one or more processors, cause the one or more processors to analyze header information of Application Programming Interface (API) call stacks between microservices; determine, for each API call stack, corresponding security key information based on the header information; determine location information of each of the microservices; and determine a vulnerability score for each of the microservices based on the corresponding security key information and corresponding location information of each of the microservices.

Description

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

As noted above, vulnerability and exposure of Application Programming Interfaces (APIs) to unauthorized access can expose microservices and the broader network to security risks and attacks. For example, use of weak types of API keys, reuse of API keys across more than a single-family of microservices, not rotating API keys periodically or with sufficient frequency, and the location of the microservice and its proximity to the external network, can increase exposure of API infrastructures to attacks and/or unauthorized access.

As described in more detail below, vulnerability or exposure of APIs may be addressed by determining an objective measure of breach exposure of Application Programming Interface (API) infrastructure for microservices utilized for various processes in a network. Such objective measure can be represented as an API score that can represent a level of exposure risk of the API infrastructure. An API score can be determined based on factors including, but not limited to, usage of API security keys (security key information) and the location information of workloads (microservices).

API security key information can be obtained by analyzing call stacks within an application node to determine types of authentication headers used in API calls between microservices and security information in the authentication headers. Based on the authentication headers, information such as key rotation schedule used for authentication of application nodes/microservices from which an API call originate, whether security keys are reused by different families of microservices, the types of security keys used, etc., can be retrieved. Furthermore, location information of application node(s) at which relevant microservice(s) are implemented can also be determined. Both the API security key information and the location information are then used for determining the vulnerability score that is representative of a breach exposure/security risk of the API infrastructure.

The disclosure begins with an initial discussion of systems and technologies for monitoring network activity. A description of example systems, methods, and environments for this monitoring technology will be discussed in FIGS. 1 through 3. The discussion will then continue with methods, systems, and non-transitory computer-readable media for determining a vulnerability score indicative of API infrastructure breach exposure of a network with reference to FIGS. 4 and 5. The disclosure concludes with a description of system/device components that can be used to implement various components of the systems described herein for determining the API infrastructure vulnerability score.

The disclosure now turns to an initial discussion of example systems and technologies for monitoring network activity.

Sensors deployed in a network can be used to gather network information related to network traffic of nodes operating in the network and process information for nodes and applications running in the network. Gathered network information can be analyzed to provide insights into the operation of the nodes in the network, otherwise referred to as analytics/telemetry data. In particular, discovered applications or inventories, application dependencies, policies, efficiencies, resource and bandwidth usage, and network flows can be determined for the network using the network traffic data. For example, an analytics engine can be configured to automate discovery of applications running in the network, map the applications' interdependencies, or generate a set of proposed network policies for implementation.

The analytics engine can monitor network information, process information, and other relevant information of traffic passing through the network using a sensor network that provides multiple perspectives for the traffic. The sensor network can include sensors for networking devices (e.g., routers, switches, network appliances), physical servers, hypervisors or shared kernels, and virtual partitions (e.g., VMs or containers), and other network elements. The analytics engine can analyze the network information, process information, and other pertinent information to determine various network insights.

Referring now to the drawings, FIG. 1 illustrates an example of a network traffic monitoring system, according to one aspect of the present disclosure. The network traffic monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 may request status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that may be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (PCAP) 126 appliance (e.g., a standalone packet monitor, a device connected to a network devices monitoring port, a device connected in series along a main trunk of a datacenter, or similar device), or other element of a network. The sensors 104 can monitor network traffic between nodes, and send network traffic data and corresponding data (e.g., host data, process data, user data, etc.) to the collectors 106 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they may continuously send network traffic data to the collectors 106. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 106. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 110. Further, collecting network traffic and corresponding data from multiple points of view ensures more accurate data is captured. For example, other types of sensor networks may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by other types of sensor networks. The sensor network 104 of various embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 100 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network traffic monitoring system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 may only serve as network storage for the network traffic monitoring system 100. In such embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it may be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 110 may be provided with examples of network states corresponding to an attack and network states corresponding to normal operation. The analytics engine 110 can then analyze network traffic and corresponding data to recognize when the network is under attack. In some embodiments, the network may operate within a trusted environment for a period of time so that the analytics engine 110 can establish a baseline of normal operation. Since malware is constantly evolving and changing, machine learning may be used to dynamically update models for identifying malicious traffic patterns.

In some embodiments, the analytics engine 110 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 may instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geo-coordinates. In some embodiments, the out-of-band data 114 and the third party data 116 may be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 may include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine may be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 may further include a search engine 156. The search engine 156 may be configured, for example to perform a structured search, an NLP (Natural Language Processing) search, or a visual search. Data may be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 may analyze the input data to determine that there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 may define an ADM for the web application as a three-tier application including a first EPG comprising the first endpoints, a second EPG comprising the second endpoints, and a third EPG comprising the third endpoints.

The presentation module 112 can include an application programming interface (API) or command line interface (CLI) 160, a security information and event management (STEM) interface 162, and a web front-end 164. As the analytics engine 110 processes network traffic and corresponding data and generates analytics data, the analytics data may not be in a human-readable form or it may be too voluminous for a user to navigate. The presentation module 112 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 162 can be implemented using Kafka for the back end, and software provided by Splunk®, Inc. of San Francisco, Calif. as the STEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a STEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
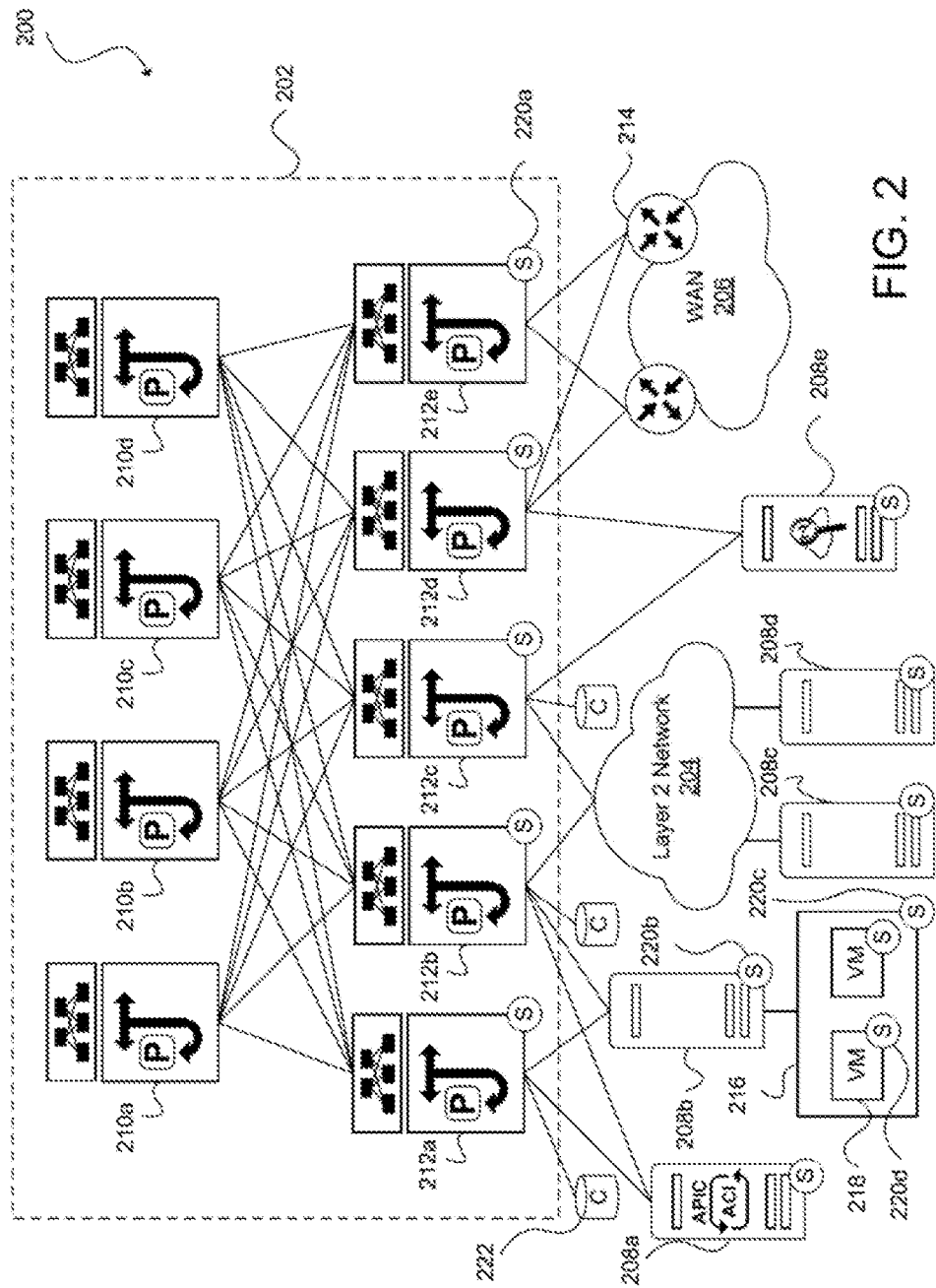
FIG. 2 illustrates an example of a network environment, according to one aspect of the present disclosure.

FIG. 2 illustrates an example of a network environment, according to one aspect of the present disclosure. In some examples, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Examples with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212d and 212e operate as border leaf switches in communication with edge devices 214 located in the external network 206. Edge devices 214 can be any one or more of a desktop, a mobile device, a laptop, a tablet, and/or any other type of known or to be developed device capable of establishing wired and/or wireless connection to other components of network environment 200. The border leaf switches 212d and 212e may be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and may accommodate a large number of components, as well as more complicated arrangements and configurations. For example, the network may include any number of fabrics 202, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 (e.g., the L3 network) can connect to the leaf switches 212d or 212e. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some examples, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 may have instantiated thereon a hypervisor 216 for creating and running one or more virtual switches (not shown) and one or more virtual machines 218, as shown for the host 208b. In other embodiments, physical servers may run a shared kernel for hosting containers. In yet other embodiments, the physical server 208 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 208a, 208c, 208d, and 208e.

The network environment 200 can also integrate a network traffic monitoring system, such as the network traffic monitoring system 100 shown in FIG. 1. For example, the network traffic monitoring system of FIG. 2 includes sensors 220a, 220b, 220c, and 220d (collectively, "220"), collectors 222, and an analytics engine 208e, that can be the same as analytics engine 110 of FIG. 1, executing on the server 208e. The analytics engine 208e can receive and process network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts 208 (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host may include multiple sensors 220 running on the host (e.g., the host sensor 220b) and various components of the host (e.g., the hypervisor sensor 220c and the VM sensor 220d) so that all (or substantially all) packets traversing the network environment 200 may be monitored. For example, if one of the VMs 218 running on the host 208b receives a first packet from the WAN 206, the first packet may pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

Cloud-native environments, such as those described above with reference to FIGS. 1 and 2, can include cloud computing systems which employ containers (e.g., container 120). Containers are a lightweight, efficient and standard way for applications to move between different environments (e.g., an on-premises site, a remote site, etc.) and run independently. In some implementations, a container may hold all the information and data which may be needed for running an application. For example, code, run time, system tools, libraries and settings for an application may be packaged in the container. The use of containers makes it possible to build distributed applications for cloud-native environments.

Different software services may be supported by cloud-native applications. The term "microservice" refers to a software service which may be used for building a distributed application using containers. A microservice architecture treats different functions of a cloud-native application (e.g., security, traffic management, etc.) as independent services that can be altered, updated, or taken down without affecting other applications in the cloud-native environment. In some examples, microservices may be built around business capabilities of a company utilizing a cloud-native environment, and the microservices may be independently deployable using fully automated deployment machinery.

Based on their infrastructure, the cloud-native applications may utilize various software services for functions such as load balancing, traffic managing, routing, health monitoring, security policies, service and user authentication, protection against intrusion, distributed denial of service (DDoS) attacks, etc. In cloud-native applications, these software services may be implemented using microservices constructs, which may involve the provision of a large number (e.g., hundreds or thousands) of containers. Discrete hardware appliances for managing these large numbers of containers are not practical, and hence, a "service mesh" is employed to manage and deliver the microservices which may be integrated within a compute cluster of a cloud-native environment, for example. The service mesh utilizes application programming interfaces (APIs) which do not need hardware appliances for their implementation. In some examples, the service mesh may deliver a pervasive layer of services across all environments that containerized applications and microservices can be connected to.

Thus, the service mesh may be used to deliver services such as traffic management, security, and observability to container-based microservices applications directly within the compute cluster. Since the service mesh provides monitoring, scalability, and high availability services through software components controlled by APIs instead of using discrete hardware appliances, the flexible framework of the service mesh reduces the operational complexity associated with modern, distributed applications. For example, the service mesh delivers application services, such as load balancing without requiring an expensive and challenging alternative such as a physical hardware appliance load balancer at each location and/or each server utilized by the cloud infrastructure.

A service mesh may be implemented using an array of network proxies alongside the containers. Each proxy or agent, referred to as a "sidecar proxy", serves as a gateway to interactions that occur between containers. A sidecar proxy assists in spreading compute load across the service mesh and directing a request to the appropriate downstream container that can serve the request. A central controller may orchestrate the connections in the service mesh, and a control plane may be configured to monitor the service traffic flowing between sidecar proxies. The control plane may deliver access control policies and collects performance metrics to be provided to the orchestrator. The orchestrator may also integrate with platforms such as open-source systems for automating the deployment and management of containerized applications.

In a service mesh infrastructure, each microservice may be developed, deployed and managed independently, as noted above. For example, new features and updates to a microservice may be delivered to the service mesh, sometimes in a rapid and incremental fashion, such that newer versions of microservices may be continually integrated into the cloud-native platform. Microservice-based applications developed in this manner are extremely dynamic as they can be updated and deployed hundreds of times a day, for example. However, given the independent manner in which the numerous microservices, and versions thereof, may be developed and deployed, there may be vulnerabilities in one or more of these microservices. Some vulnerabilities may be severe and cause widespread disruption across the service mesh, while others may be less severe and contained. Identifying the vulnerabilities, recognizing potential containers which may be affected and taking action based on the criticalities of these vulnerabilities is a challenge. The following sections describe systems and methods for protecting an example service mesh from software vulnerabilities.

Figure 3:
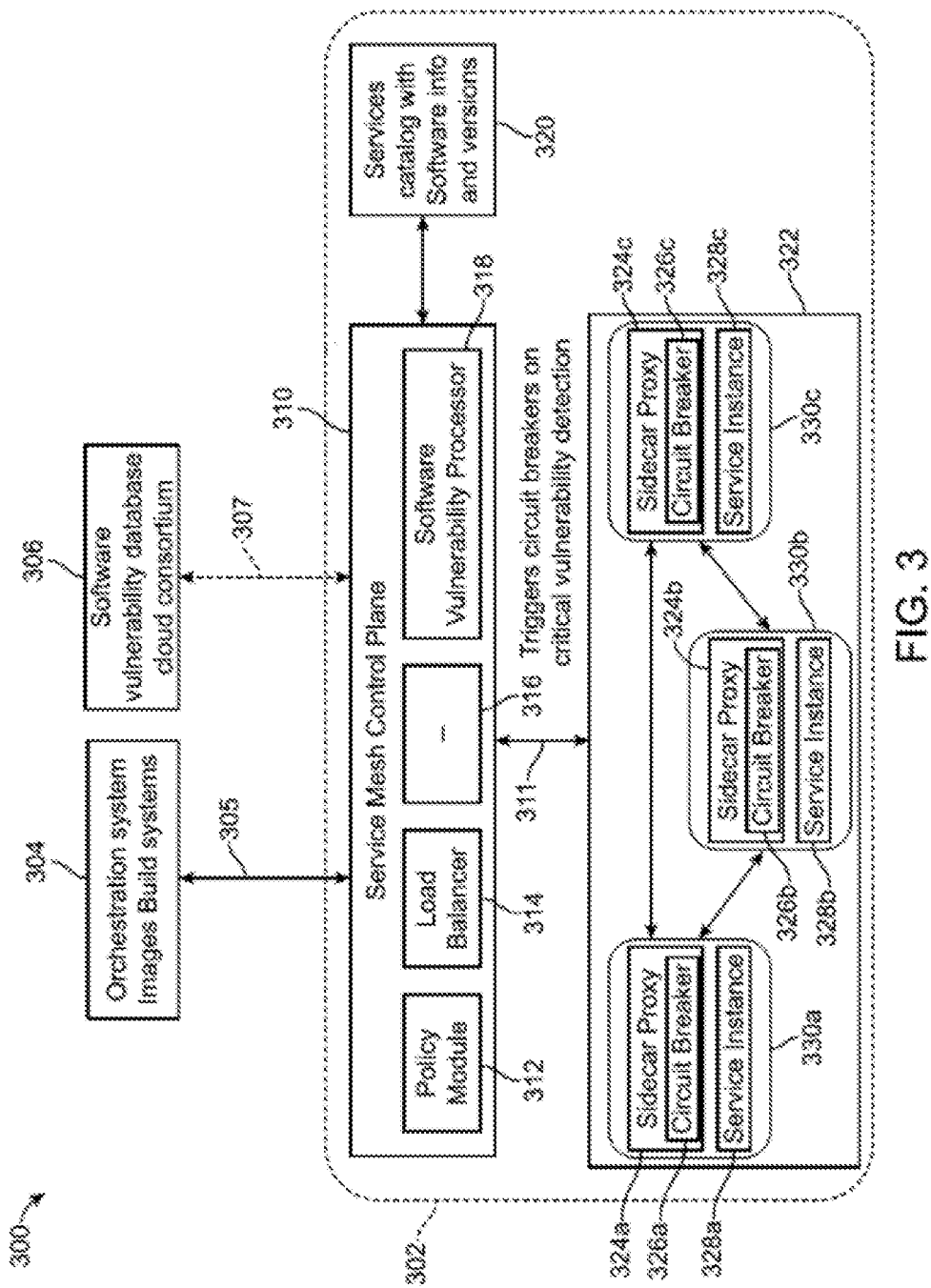
FIG. 3 illustrates an example topology of a network, according to one aspect of the present disclosure.

FIG. 3 illustrates an example topology of a network 300 configured to implement aspects of this disclosure. The network 300 may be an enterprise network for supporting cloud-native applications. In some aspects, the network 300 may be include an example implementation of the enterprise network 200 of FIG. 2.

For example, the network 300 illustrates a service mesh 302 which may provisioned with a network fabric such as the network fabric 202 of FIG. 2. The service mesh 302 may be a software defined network (SDN) and include a centralized control plane 310 that configures the data plane of the service mesh 302. The service mesh 302 provides an infrastructure layer for governing service-to-service communications. The service mesh 302 includes an array 322 of network proxies. Among the various network proxies which the array 322 may include, sidecar proxies 324a-c are illustrated, and will be explained in more detail below.

As will be understood by one skilled in the art, enterprise networks may use proxies for implementing security measures and managing accesses to services. For example, if a user in an office environment of a company requests a webpage from a computer in the office, then the request may first be received by a web proxy of the company which may check the request for security issues. Once the security measures implemented by the web proxy are cleared, then the request may be sent to an external server that hosts the web page. When the web page is returned back to the computer in response to the request, the web proxy may once again check the content in the web page being returned for security issues, and then the proxy returns the web page and its contents of the web page to the user. In the service mesh 302, requests are routed between microservices through proxies in their own infrastructure layer. For this reason, individual proxies that make up a service mesh are referred to as sidecars or sidecar proxies, since they run alongside each service, rather than within them. The sidecar proxies 324a, 324b, and 324c are examples of such sidecar proxies which may be present in the service mesh 302.

A sidecar proxy may handle access and security measures for one or more service instances to which the sidecar proxy is paired. For example, service instances 328a, 328b, and 328c are shown in FIG. 3, paired with respective sidecar proxies 324a, 324b, and 324c. Further, a service instance and its paired sidecar may proxy share a container. For example, containers 330a, 330b, and 330c are shown, wherein each container 330a, 330b, and 330c may be shared by a respective service instance 328a, 328b, and 328c and sidecar proxy 324a, 324b, and 324c. The sidecar proxies 324a, 324b, and 324c can handle communication with service instances of other containers. For example, the sidecar proxy 324a of the container 330a may handle communication of the service instance 328a with the service instance 328b of the container 330b. The sidecar proxies 324a, 324b, and 324c can also support capabilities such as discovery of service instances, load balancing, authentication and authorization, secure communications, etc., in the service mesh 302. The service instances 328a, 328b, and 328c may be microservices. As previously explained, the microservices may be a specialization of an implementation approach for service-oriented architectures (SOA) used to build flexible, independently deployable software systems.

The control plane 310 may handle the control functions for the service mesh 302, as previously mentioned. For example, the control plane 310 may install and maintain policy and configuration on the service instances 328a, 328b, and 328c (e.g., through respective sidecar proxies 324a, 324b, and 324c). The control plane 310 may instructs the sidecar proxies 324a, 324b, and 324c with dynamic updates to these policies and configurations in some examples. Accordingly, the control plane 310 may include different modules for carrying out these functions. For example, the control plane 310 may include a policy module 312 for defining and managing network policies, traffic policies, etc. The control plane 310 may also include a load balancer 314 for implementing load balancing schemes for balancing the traffic and workloads in the service mesh 302. One or more other modules which may be present in the control plane 310 are generically shown as the module 316, for performing the one or more control functions discussed with reference to FIGS. 1 and 2.

In example aspects, the control plane 310 may include a software vulnerability processor (SVP) 318 for handling the various functions related to identifying, isolating, and rectifying software vulnerabilities, for example. In one or more examples, the SVP 318 (or more generally, the control plane 310) may be in communication with a services catalog 320. The services catalog 320 may maintain a catalog of various details, such as the software versions, origin, release date, etc., for the software running in the various service instances 328a, 328b, and 328c of the service mesh 302, for example. Accordingly in some examples, the services catalog 320 may contain an up to date mapping of the software (and version thereof) and the service instances 328a, 328b, and 328c. The services catalog 320 may be updated in one or more manners, which will be described below.

As shown in FIG. 3, the control plane 310 of the service mesh 302 may communicate with one or more external entities. Among these, an orchestration system 304 may work in coordination with the service mesh 302 for deployment, scaling, and management of containerized applications such as in the containers 330a, 330b, and 330c (which may be the same as container 120 of FIG. 1) of the service mesh 302. For example, open-source orchestration systems are known in the art for automatic management or containerized applications. The orchestration system 304 may, among other functions, maintain the state of workloads/applications, container images, network resources, etc.

The service mesh 302 may also be in communication with various other external feeds (e.g., feed 307), for obtaining information on potential vulnerabilities in the software executing in its containers 330a. 330b, and 330c, for example. The software vulnerabilities discussed herein may pertain to any exposures identified in the service instances which may compromise privacy, security, efficiency, accuracy, performance, etc., of the service instances. In some examples, the vulnerabilities may be program bugs, loopholes in service and user authentication, gaps in protection against intrusion, exposure to distributed denial of service (DDoS) attacks, etc. The potential software vulnerabilities may or may not have a fix readily available. A software vulnerability database cloud consortium 306 may source vulnerability information from various repositories and standards, such as the National Vulnerability Database (NVD), Product Security Incident Response Team (PSIRT), etc., and supply this information on the external feed 307 to the service mesh 302. The software vulnerability ledger blockchain 308 may provide another external feed 309 to the service mesh 302 with vulnerabilities obtained from blockchain ledgers and other distributed ledgers, for example. Although not exhaustively shown and described, various other such external feeds may provide information to the service mesh 302 about any software vulnerabilities which have been identified in the industry, publicly known, or sourced from private entities.

In one or more examples, the control plane 310, or more specifically, the SVP 318 may interact with these external feeds 307, 309, etc., and gather software vulnerability and remediation information. In some examples, the SVP 318 may implement the following processes detecting vulnerabilities which may affect the service mesh 302. The SVP 318 may monitor the external feeds 307, 309 and consult the services catalog 320 to determine if any vulnerability is reported on the external feeds 307, 309 which may affect one or more services in the services catalog 320. Further, as and when any new services are added in the service mesh 302 or service discovery functions identify new services in the service mesh 302, the SVP 318 may update the services catalog 320 and monitor the external feeds 307, 309 to determine if any new or updated information added to the services catalog 320 may have vulnerabilities reported by the external feeds 307, 309.

With examples of a networking environment described above with reference to FIGS. 1-3, the disclosure now turns to systems and techniques for determining an objective measure of breach exposure of Application Programming Interface (API) infrastructure for microservices utilized for various processes in a network. Such objective measure can be represented as an API score that can represent a level of exposure risk of the API infrastructure. An API score can be determined based on factors including, but not limited to, usage of API security keys (security key information) and the location information of workloads (microservices).

Figure 4:
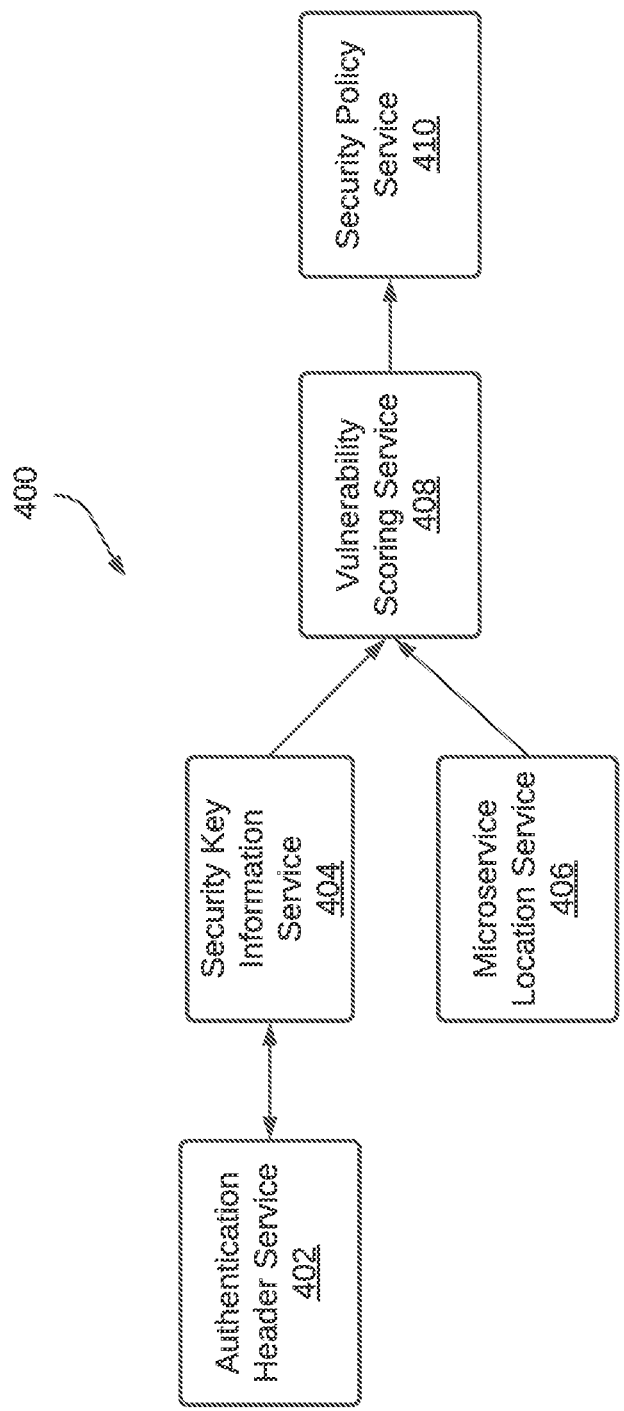
FIG. 4 illustrates an example of a microservice security system, according to one aspect of the present disclosure.

FIG. 4 illustrates an example of a microservice security system, according to one aspect of the present disclosure. The microservice security system 400 and various services thereof, as described below with reference to FIG. 4, can be implemented as part of analytics engine 110 of FIG. 1 or SVP 318 of FIG. 3. Microservice security system 400 can include an authentication header service 402, a security key information service 404, a microservice location service, a vulnerability scoring service 408, and a security policy service 410. The microservice security system 400 illustrates various functional blocks, corresponding functionality of each of which is described below. Example functional blocks may be implemented by a suitable combination of computational devices, network systems, and storage mechanisms such as those provided in example network structures of FIGS. 1-3.

Authentication header service 402 can be used to determine authentication header information in API call stacks within application nodes. An application node can be any network node on which a microservice or microservices are being executed (e.g., any one of servers 208 of FIG. 2 on which container 120 and/or any one of service instances 330a, 330b, 330c of FIG. 3 may be executed). For example, the authentication header service 402 can extract the authentication header information from an API call stack within an application node.

The authentication header service 402 can extract the authentication header information from the plain text version of API call stacks, utilizing the functionalities of a sensor (e.g., such as sensor 104 or any one of sidecar proxies 324a, 324b and/or 324c of FIG. 3). In one example, a sensor can be a Runtime Application Self-Protection (RASP) agent. In one example, the content of the API call stacks may not be available for examination after the API calls enter into a Transmission Control Protocol (TCP) session protected by Transport Layer Security (TLS) protocols. Accordingly, the authentication header service 402 can extract the authentication header information after the caller microservice (e.g., any one of microservices 330a, 330b and/or 330c of FIG. 3) makes the API calls and before the API calls enter into the TCP session. Persons of ordinary skill in the art will also readily appreciate that there are other techniques for extracting authentication header information.

Example types of the extracted authentication header information of an API key include, but are not limited to the destination address of the API call stacks, resource locator information of the API call stacks, credential header information of the API call stacks, source information of a network address, service address, port, etc., originating the API call stacks, and a timestamp of the API call stacks.

After the extraction process, the authentication header service 402 can index the API call stacks based on the extracted authentication header information. The authentication header service 402 can index and store each API call stack with corresponding authentication header information. The authentication header service 402 can also index API call stacks into groups based on shared similarities in the authentication header information. For example, the API call stacks having the same destination address can be indexed and stored together. Such an index can be generated for each microservice or the whole application node. Additional information can also be included in the index, such information will be described with regard to FIG. 5.

After processing the authentication header information in an API call stack at an application node, the authentication header service 402 can transmit the processed authentication header information to the security key information service 404.

The security key information service 404 can determine security key information based on the authentication header information from the authentication header service 402. Specifically, the security key information service 404 can determine a type of each authentication header information and security information associated with each authentication header. This step is described in more detail with reference to FIG. 5.

Example types of security key information include, but are not limited to, types of security keys used for API call stacks, security key rotation schedule for API call stacks authentication, and reused security keys across more than one family of the microservices. Non-limiting examples of types of security keys include hashes in various authentication header types such as basic, bearer, digest, HTTP Origin-Bound Authentication (HOBA), etc.

Next, the security key information service 404 can transmit the determined security key information to the vulnerability scoring service 408 for determining the vulnerability score, as described below.

The microservice security system 400 also includes a microservice location service 406. The microservice location service 406 can detect the location information of the workloads (network or application nodes on which one or more relevant microservices are executed), utilizing the functionalities of the sensors within the network environment as described with regard to FIG. 1 (e.g., a sensor 104).

Examples of the location information include, but are not limited to location of network node(s) on which relevant microservice(s) are executed inside the network (e.g., at an edge node, and a distance thereof to an external network such as the Internet).

After detecting the location information of the microservices, the microservice location service 406 can transmit such location information to the vulnerability scoring service 408 for determining the vulnerability score for each microservice.

The vulnerability scoring service 408 can determine a vulnerability score for each of the microservices based on the security key information from the security key information service 404 and the location information from the microservice location service 406. With a uniform vulnerability score for each of the microservices in the application, network operators can more easily evaluate breach exposure of API infrastructures and hence associated microservices in a network, followed by identifying and fixing API keys used for API calls to and from microservices, in order to address (reduce) breach exposure of a network's API infrastructure. The determination of such vulnerability scores is described in more detail with regard to FIG. 5.

After determining the vulnerability score, the vulnerability scoring service 408 can transmit the vulnerability score to the security policy service 410. The security policy service may apply security policies to the microservice based on a corresponding vulnerability score (e.g., manually or automatically, as described in more detail below).

Although FIG. 4 illustrates an example configuration of the various components of a microservice security system 400 applied within example network environment of FIGS. 1-3, those skilled in the art will understand that the components of the microservice security system 400 or any system described herein can be configured in a number of different ways and can include any other type and number of components. For example, functionalities of the authentication header service 402, the security key information service 404, the microservice location service 406, the vulnerability scoring service 408, and/or the security policy service 410 can be implemented using a single component or set of instructions executed by a processor. In another example, part or all of the authentication header service 404, the security key information service 404, the microservice location service 406 can be included in the vulnerability scoring service 408. Services can also be combined into fewer components and/or further divided into more components.

With examples of a microservice security system 400 described above with reference to FIG. 4, the disclosure now turns to example methods for determining a vulnerability score for microservices of an application node. In one example, analytics engine 110 may implement the process of FIG. 5 by executing relevant services of microservice security system 400 of FIG. 4 to determine a vulnerability score indicative of security posture of API keys used for API calls between microservices and hence the overall security posture of a network's API infrastructure of an application node based on the API security key information and the location information of the microservices, such as the information transmitted by the security key information service 404 and microservice location service 406. As noted above, functionalities of the microservice security system 400 can be implemented by analytics engine 110 or other components shown in the network environment 100.

Figure 5:
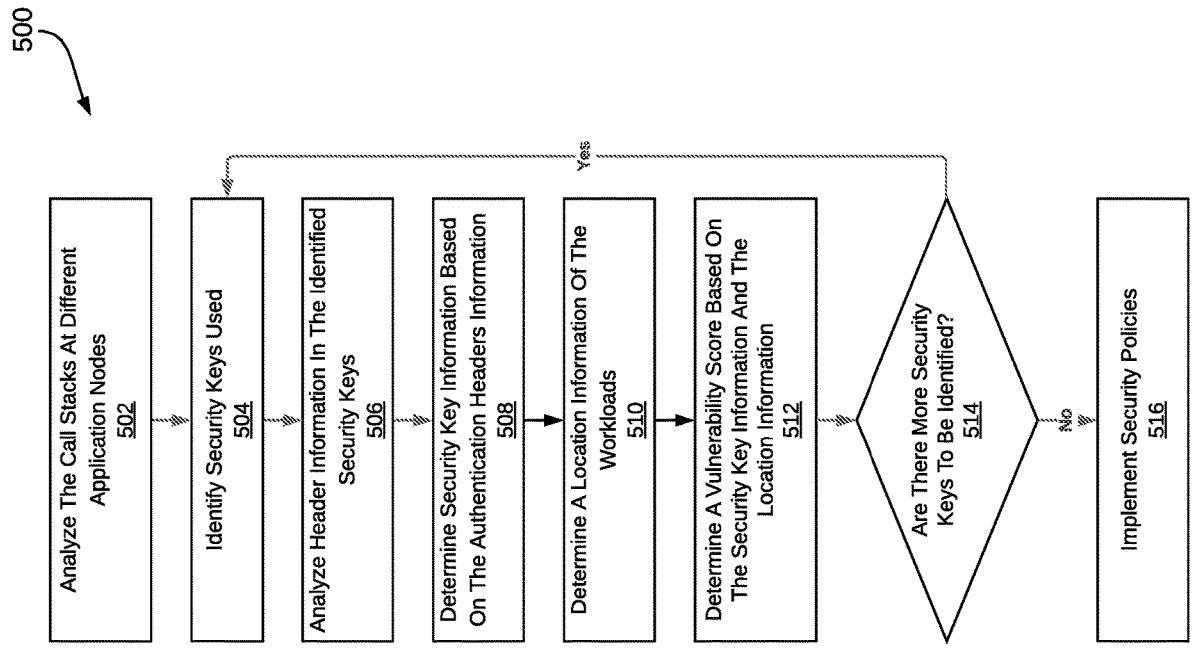
FIG. 5 illustrates an example method for determining a vulnerability score indicative of security posture of API keys used for API calls between microservices, according to one aspect of the present disclosure.

FIG. 5 illustrates an example method 500 for determining a vulnerability score indicative of security posture of API keys used for API calls between microservices, according to one aspect of the present disclosure. Process of FIG. 5 will be described from the perspective of any one or more of the SVP 318 of FIG. 3. However, the process of FIG. 5 can also be performed by analytics engine 110 and/or microservice security system 400. It should be understood that SVP 318, analytics engine 110 and/or the microservice security system 400 may each have one or more processors executing computer-readable instructions stored on an associated memory to implement the method 500 of FIG. 5.

At S502, SVP 318 may analyze the call stacks at different application nodes. In one example, analyzing a call stack may include parsing header information of a call stack to identify information on included security key(s), etc.

At S504, the SVP 318 may identify security key(s) used in API call stacks for API calls between microservices based on the analyzing of S502. At S506, the SVP 318 may analyze authentication header information in the identified security keys.

At S508, SVP 318 may determine security key information based on the authentication header information for an API call stack analyzed at S506. In one example, authentication header information can include a type of the authentication header used and security information of the authentication header.

In determining the security key information, the SVP 318 can classify the authentication scheme of an API call stack based on the authentication header information, and determine the types of security keys (security key information) used for such an API call stack based on the classified authentication scheme. In one example, the security key information service 404 can first classify the authentication scheme of an API call stack based on the credential header information of the API call stacks extracted by the authentication header service 402. Examples of authentication schemes of an API call stack include, but are not limited to basic Hypertext Transfer Protocol (HTTP) authentication scheme, bearer token authentication scheme, HTTP digest access authentication scheme, HTTP Origin-Bound Authentication (HOBA) scheme, and mutual authentication scheme. Each of the authentication schemes can be classified based on corresponding techniques of authentication, and the types of security keys used can be determined based on the corresponding techniques of authentication. For example, the basic Hypertext Transfer Protocol (HTTP) authentication scheme includes transmission of the credentials as user-id/password pairs in the credential header information. The bearer token authentication scheme includes granting access to any party in possession of a bearer token. The HTTP digest access authentication scheme includes providing a simple challenge-response authentication mechanism that may be used by a server to challenge a client request and by a client to provide authentication information. HOBA scheme includes providing a digital-signature-based design for an HTTP authentication method. The mutual authentication scheme includes providing true mutual authentication between an HTTP client and an HTTP server using password-based authentication, which may be different from the basic HTTP authentication scheme and HTTP digest access authentication in that the mutual authentication scheme assures the user that the server is aware of the user's encrypted password. Based on the classification of the authentication scheme, the security key information service 404 can determine the types of security keys used for each API call stack.

In another example, the security key information service 404 can determine the security key rotation schedule based on the credential header information of the API call stacks and the timestamp of the API call stacks. In this example, the security key information service 404 can identify API call stacks with the same security key based on the credential header information. A security key rotation (which can interchangeably be used with reuse) schedule can be determined based on the time between two consecutive instances of API call stacks with the same security key. Specifically, the security key information service 404 can determine the time lapse between such two consecutive instances of API call stacks using the timestamps of each API call stack. Example security key rotation schedule can include every day, every week, or every month.

In another example, the security key information service 404 can determine whether there are reused security keys across more than one family (group) of the microservices based on the destination address of the API call stacks, resource locator information of the API call stacks, credential header information of the API call stacks, and source information of a port originating the API call stacks. In this example, the security key information service 404 can identify groups of API call stacks with the same security key based on the credential header information. Within each of the identified group of API call stacks, the security key information service 404 can determine the specific family of microservice each API call stack is associated with, by analyzing the destination address of the API call stacks, resource locator information of the API call stacks, and source information of a port originating the API call stacks. Thus, the security key information service 404 can determine that there are reused security keys across more than one family of the microservices if there are at least two of API call stacks from different families of microservices within the same identified group.

The security key information service 404 can also index the security key information of each API call stack. For example, the security key information service 404 can index each of the microservices with a corresponding set of API call stacks and security key information of the corresponding set of API call stacks in a time series. In some examples, such an index may be generated based on the index generated by the authentication header service 402. Such an index organizing the security information can help the vulnerability scoring service 408 to identify violations of API call stacks and determining security scores for microservices. These processes will be described in detail with regard to S508.

At S510, the SVP 318 may determine a location information of the workloads of the application node, as described above with regard to the microservice location service 406. The workloads are where the microservices are being located. In a microservice architecture, locations or tiers of workloads include, but are not limited to, Ingress/Load balancer tier, web server tier, application tier, background worker tier, database tier, etc. Topology information of a microservice architecture can be derived from an orchestration system such as service mesh 302 or orchestration system 304 of FIG. 3 that can orchestrate microservice deployments. For example, information gathered by sensors 104 can be utilized to determine such location information.

At S512, the SVP 318 may determine a vulnerability score for a microservice based on the security key information and the location information. For example, the location information of workloads may include microservice orchestration system's (e.g. orchestration system 304) deployment topological information. Thus, the vulnerability score could be determined based on such deployment topological information. Examples of such deployment topological information may be ranked based on their proximity to the internet: ingress/load balancer tier, web server tier, application tier, background worker tier, and database tier, with ingress/load balancer tier being closest to the internet and data base tier being furthest from the internet.

In some examples, such deployment topological information of the microservice orchestration system may not be available. Accordingly, the following equation (1) below can be used to determine the vulnerability score of a microservice.

$$\text{Vulnerability score} = \text{Number of internet access points} * \text{Access vector multiplier} * [\Sigma(\text{API security key 1 score}, \text{API security key 2 score}, \ldots, \text{API security key } n \text{ score})] \quad (1)$$

In equation (1), the number of internet access points represents the number of internet access points of a given microservice, and can be determined based on the location information for such microservice. For example, the location of the microservice within the application node can be used to determine potential internet access points for the microservice. Based on the potential internet access points, the distance between the microservice and an external network (e.g., the Internet) can help to determine the actual number of internet access points. Because more internet access will increase the security risk of a microservice, a higher number of internet access points will indicate an increased potential for breach exposure.

The access vector multiplier of equation (1) represents the internet exposure of the microservice. For example, a higher access vector multiplier can be imposed if the microservice resides on a workload that has internet access or if the microservice resides within a certain distance to the internet. In some examples, the access vector multiplier can be a predetermined number. Such a predetermined number can be chosen based on the location information and user input.

Each of the API security key 1 score, API security key 2 score, . . . , API security key n score represent a vulnerability score for a security key, such as the API key 1. The number n can be a positive integer greater than 1 and can represent the number of active security keys for determining the vulnerability score of a microservice. Active security keys can be defined as security keys being used within a set time period (which can be a configurable parameter determined based on experiments and/or empirical studies) for determining the vulnerability score of a microservice. In one example, the summation of these vulnerability scores for all the active API security keys of the microservice can represent the vulnerability (breach exposure) of a microservice from the individual API call stacks security key perspective.

These vulnerability scores for API call stack security keys used for a microservice can be determined based on the security key information. In some examples, the vulnerability score for each API call stack security key can be a weighted summation of three individual scores based on types of security keys used for API call stacks, security key rotation schedule for API call stacks authentication, and reused security keys across more than one family of the microservices.

Such individual scores can be a predetermined number based on user input or a computed evaluation based on each security key information. For example, a lower individual score based on the types of security keys can be computed for a security key that is deemed less secure. In this example, individual scores for security keys can be ranked from lower to higher by the corresponding authentication schemes in the following order including basic HTTP authentication scheme, bearer token authentication scheme, HTTP digest access authentication scheme, HOBA scheme, and mutual authentication scheme. Persons of ordinary skill in the art will also readily appreciate that other orders are possible based on individual user's specific situation. In some examples, a predetermined base score can be assigned to each type of security keys, and these predetermined base score can be stored with each security key with its corresponding microservice in the index generated by the security key information service 404.

In another example, a lower individual score based on the security key rotation schedule can be computed for security keys that are not rotated frequently. Rotation frequency for the security keys can be evaluated based on whether the security keys are being rotated at specific intervals, and how long the specific intervals are (with the intervals and/or periodicity thereof being configurable parameters determined based on experiments and/or empirical studies). The specific intervals can be every day, every week, every month, etc. In this example, a lower score can be computed for security keys that are not being rotated at specific intervals, or for security keys that are rotated with a longer specific interval. The specific intervals can be chosen by the users based on their specific needs.

In another example, a lower individual score based on the reused security keys can be computed for security keys that are being reused across more than one family of the microservices. In this example, the score can also be inversely proportional to the number of families of microservices across which a specific security key has been reused. The score can also be inversely proportional to the number of times that a specific security key has been reused.

The vulnerability score of a microservice can also be determined based on security violations of each security key. Specifically, the vulnerability scoring service 408 may identify a set of violations based on the security key information and the location information, and assign a base score for each of the violations. The vulnerability scoring service 408 may then determine the vulnerability score of a microservice by calculating a summation of scores based on each violation.

The security violation can be identified using the indexes generated by the authentication header service 402 or the security key information service 404, and a base score can be assigned to each violation and is stored with the corresponding API call stack security key in the index. The SVP 318 may provide a list of security violations, but users can modify such a list based on their specific needs.

In an example using the index generated by the authentication header service 402, the microservice security system 400 can identify a violation when there are similarities in any of the following extracted authentication header information for the API call stacks of an application node over a certain time period. The extracted authentication header information includes the destination address of the API call stacks, resource locator information of the API call stacks, credential header information of the API call stacks, and source information of a port originating the API call stacks.

In another example using the index generated by the security key information service 404, the SVP 318 can identify a violation when there are certain less secure types of security keys, such as security key used in the basic HTTP authentication scheme, being used for API call stacks within a microservice. The SVP 318 can also identify a violation when the security key rotation interval of a security key is longer than a set period, such as a month. The SVP 318 can also identify a violation when security keys are being reused across more than one family of the microservices.

In some other examples, the individual vulnerability scores for API call stack security keys included in formula 1, such as outbound key 1 score, can also be calculated based on the above security violations of each security key. However, persons of ordinary skill in the art will also readily appreciate that other combinations of calculations are also possible.

In the above examples, a lower vulnerability score implies a higher API infrastructure breach exposure for a microservice. However, those skilled in the art will also readily appreciate that other scoring schemes, such as presenting the score as a percentage or using a higher score to indicate a higher API infrastructure breach exposure, are also possible.

At S514, the SVP 318 may determine whether there are more security keys to be identified. If at S514, the SVP 318 determines there are more security keys to be identified, the process may revert back to S504 and the SVP 318 may repeat S504 to S514 as described above.

If at S514, the SVP 318 determines there are no more security keys to be identified, then at S516, the analytics engine 110 may implement (apply) security policies on the application node based on the vulnerability score. Security policies can be predetermined and stored in the microservice security system 400, but they can also be modified based on individual user's needs.

In one example, applying security policies can include presenting a vulnerability score for each of the microservices to the user. This presentation can provide the user with a simple and straight forward evaluation of an API infrastructure breach exposure based on the security keys used in the API call stacks. For example, the SVP 318 can present a list of the microservices included in all the application nodes associated with the user and the corresponding vulnerability score for each microservice.

In another example, applying security policies can include alerting about a microservice if the vulnerability score of the microservice is below a threshold score, and providing solutions (e.g., deleting a security key, using a different existing key, generating a new key, etc.) based on the security key information of this microservice. The alert can be presented through a user interface including the vulnerability score and/or the suggested solutions. For example, the user can choose to receive alert for any microservice with a vulnerability score lower than 50, and choose whether to receive the corresponding suggested solution or not.

In another example, applying security policies can include stopping at least one API call stacks of a microservice with a vulnerability score below a threshold score. For example, the SVP 318 can identify the specific security keys used for accessing the microservice that have the lowest scores. The API call stacks using these security keys with the lowest scores can be deemed as insecure, and the analytics engine 110 can stop these API calls to that particular microservice to decrease the API infrastructure breach exposure of the microservice.

Components of the microservice security system 400 can also utilize a trained machine learning model to perform some or all of the steps of method 500.

With examples of a network environment, a microservice security system, and a method for determining a vulnerability score for microservices of an application node described with reference to FIGS. 1-5, the disclosure now turns to FIGS. 6A and 6B for description of example system architectures for implementing the microservice security system 400 and/or other components of systems described above.

Figure 6A:
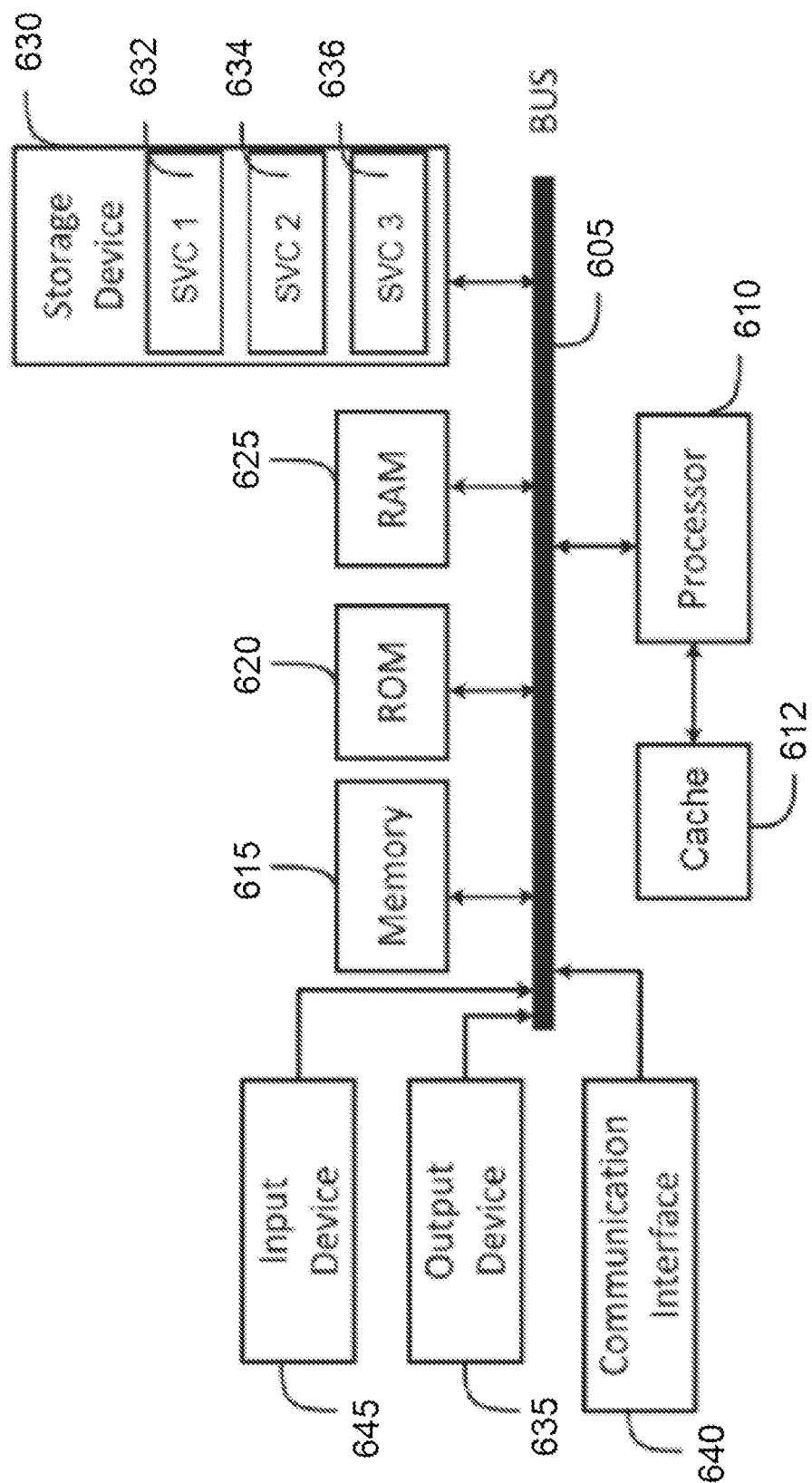
FIGS. 6A and 6B illustrate examples of systems, according to one aspect of the present disclosure.
Figure 6B:
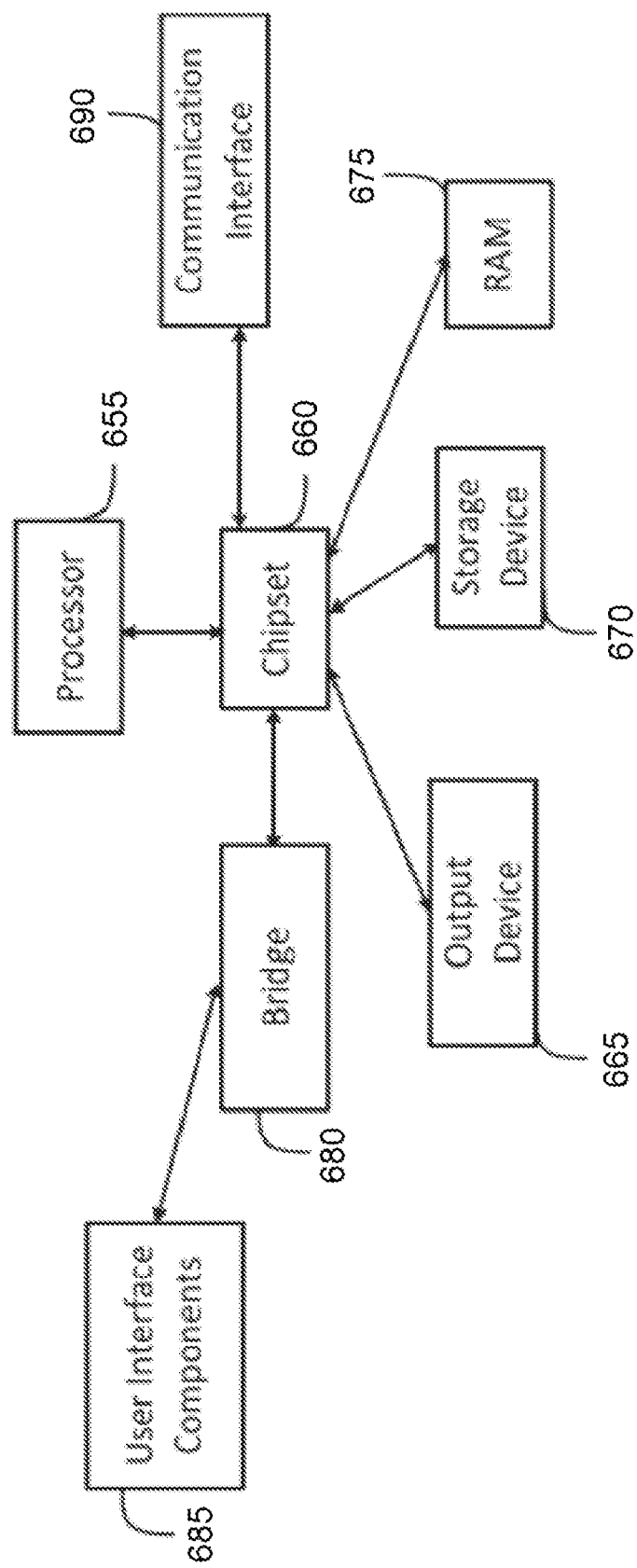

FIG. 6A and FIG. 6B illustrate examples of systems, according to one aspect of the present disclosure. The more appropriate system will be apparent to those of ordinary skill in the art when practicing the various embodiments. Persons of ordinary skill in the art will also readily appreciate that other systems are possible.

FIG. 6A illustrates an example architecture for a bus computing system 600 wherein the components of the system are in electrical communication with each other using a bus 605. The computing system 600 can include a processing unit (CPU or processor) 610 and a system bus 605 that may couple various system components including the system memory 615, such as read-only memory (ROM) in a storage device 670 and random access memory (RAM) 675, to the processor 610. The computing system 600 can include a cache 612 of high-speed memory connected directly with, in close proximity to, or integrated as part of the processor 610. The computing system 600 can copy data from the memory 615 and/or the storage device 630 to the cache 612 for quick access by the processor 610. In this way, the cache 612 can provide a performance boost that avoids processor delays while waiting for data. These and other services can control or be configured to control the processor 610 to perform various actions. Other system memory 615 may be available for use as well. The memory 615 can include multiple different types of memory with different performance characteristics. The processor 610 can include any general-purpose processor and a hardware module or software service, such as service1 632, service2 634, and service3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

Storage device 630 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software services 632, 634, 636 for controlling the processor 610. Other hardware modules or software services are contemplated. The storage device 630 can be connected to the system bus 605. In one aspect, a hardware module that performs a particular function can include the software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, and solid state media, for example. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 655 analyzing data stored in the storage device 670 or the RAM 675. Further, the computing system 600 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
analyzing header information of Application Programming Interface (API) call stacks between microservices;
determining, for each API call stack, corresponding security key information based on the header information;
determining location information of each of the microservices; and
determining a vulnerability score for each of the microservices based on the corresponding security key information and corresponding location information of each of the microservices.

2. The method of claim 1, wherein the header information includes:
at least one destination address associated with each API call stack,
resource locator information of each API call stack,
credential header information of each API call stack,
source information of at least one network address originating each API call stack, and
a timestamp of each API call stack.

3. The method of claim 1, wherein the corresponding security key information includes at least a type of security keys used, a security key rotation schedule for API call stack authentication, and reused security keys across more than one group of the microservices.

4. The method of claim 1, wherein determining the corresponding security key information based on the header information further comprises:
indexing each of the microservices with a corresponding set of the API call stacks in a time series with security key information of the corresponding set of the API call stacks.

5. The method of claim 1, wherein determining the vulnerability score for each of the microservices further comprises:
identifying a set of violations based on the security key information and the location information; and
assigning a base score for each of the set of violations.

6. The method of claim 1, wherein the location information of each of the microservices includes a location of each of the microservices and a distance between each of the microservices and an external network.

7. The method of claim 1 further comprising:
applying security policies on an application node based on the vulnerability score, wherein the security policies include at least one of:
presenting a vulnerability score for each of the microservices;
generating an alert for a first microservice of the microservices if a first vulnerability score of the first microservice is below a first threshold score, and providing at least one solution based on the security key information; and
stopping an API call to a second microservice of the microservices with a second vulnerability score below a second threshold score.

8. A system comprising:
one or more memories having computer-readable instructions stored therein; and
one or more processors configured to execute the computer-readable instructions to:
analyze header information of Application Programming Interface (API) call stacks between microservices;

determine, for each API call stack, corresponding security key information based on the header information;

determine location information of each of the microservices; and determine a vulnerability score for each of the microservices based on the corresponding security key information and corresponding location information of each of the microservices.

9. The system of claim 8, wherein the corresponding security key information includes at least a type of security keys used, a security key rotation schedule for API call stack authentication, and reused security keys across more than one group of the microservices.

10. The system of claim 8, wherein the security key information includes types of security keys used for API call stacks, security key rotation schedule for API call stacks authentication, and reused security keys across more than one family of the microservices.

11. The system of claim 8, wherein the one or more processors are configured to execute the computer-readable instructions to determine the corresponding security key information based on the header information by indexing each of the microservices with a corresponding set of the API call stacks in a time series with security key information of the corresponding set of the API call stacks.

12. The system of claim 8, wherein the one or more processors are configured to execute the computer-readable instructions to determine the vulnerability score for each of the microservices by:

identifying a set of violations based on the security key information and the location information; and assigning a base score for each of the set of violations.

13. The system of claim 8, wherein the location information of each of the microservices includes a location of each of the microservices and a distance between each of the microservices and an external network.

14. The system of claim 8, wherein the one or more processors are configured to execute the computer-readable instructions to:

applying security policies on an application node based on the vulnerability score, wherein the security policies include at least one of:

presenting a vulnerability score for each of the microservices;

generating an alert for a first microservice of the microservices if a first vulnerability score of the first microservice is below a first threshold score, and providing at least one solution based on the security key information; and stopping an API call to a second microservice of the microservices with a second vulnerability score below a second threshold score.

15. One or more non-transitory computer-readable storage media comprising computer-readable instructions which, when executed by one or more processors, cause the one or more processors to:

analyze header information of Application Programming Interface (API) call stacks between microservices;

determine, for each API call stack, corresponding security key information based on the header information;

determine location information of each of the microservices; and determine a vulnerability score for each of the microservices based on the corresponding security key information and corresponding location information of each of the microservices.

16. The one or more non-transitory computer-readable storage media of claim 15, wherein the header information includes:

at least one destination address associated with each API call stack, resource locator information of each API call stack, credential header information of each API call stack, source information of at least one network address originating each API call stack, and a timestamp of each API call stack.

17. The one or more non-transitory computer-readable storage media of claim 15, wherein the corresponding security key information includes at least a type of security keys used, a security key rotation schedule for API call stack authentication, and reused security keys across more than one group of the microservices.

18. The one or more non-transitory computer-readable storage media of claim 15, wherein execution of the computer-readable instructions by the one or more processors further cause the one or more processors to determine the corresponding security key information based on the header information by indexing each of the microservices with a corresponding set of the API call stacks in a time series with security key information of the corresponding set of the API call stacks.

19. The one or more non-transitory computer-readable storage media of claim 15, wherein execution of the computer-readable instructions by the one or more processors further cause the one or more processors to determine the vulnerability score for each of the microservices by:

identifying a set of violations based on the security key information and the location information; and assigning a base score for each of the set of violations.

20. The one or more non-transitory computer-readable storage media of claim 15, wherein the location information of each of the microservices includes a location of each of the microservices and a distance between each of the microservices and an external network.

* * * * *